Jan. 10, 1956 L. W. SCHNEPP Re. 24,106

FLUSH BALL GUIDE

Original Filed May 21, 1951

INVENTOR.
LOUIS W. SCHNEPP
BY
Martin P. Smith
ATTORNEY.

United States Patent Office

Re. 24,106
Reissued Jan. 10, 1956

24,106

FLUSH BALL GUIDE

Louis W. Schnepp, San Bernardino, Calif.

Original No. 2,666,929, dated January 26, 1954, Serial No. 227,389, May 21, 1951. Application for reissue August 29, 1955, Serial No. 531,307

5 Claims. (Cl. 4—57)

Matter enclosed in heavy brackets [ ] appears in the original patent but forms no part of this reissue specification; matter printed in italics indicates the additions made by reissue.

My invention relates to a flush ball guide of the particular type disclosed in my copending application for patent filed March 13, 1951, Serial Number 215,278 on Flush Ball Guides and the principal object of the present invention, is to generally improve upon the construction of the ball guide disclosed in the aforesaid application for patent and more particularly, to provide the ball valve pull rod, with a resilient bearing which eliminates practically all friction during normal operations and enables the flushing action to take place easily, positively and with minimum noise.

This application should be read in connection with the specification forming part of the application above identified.

With the foregoing and other objects in view, my invention consists in certain novel features of construction and arrangement of parts, hereinafter more fully described, and claimed and illustrated in the accompanying drawing, wherein:

Figure 2:
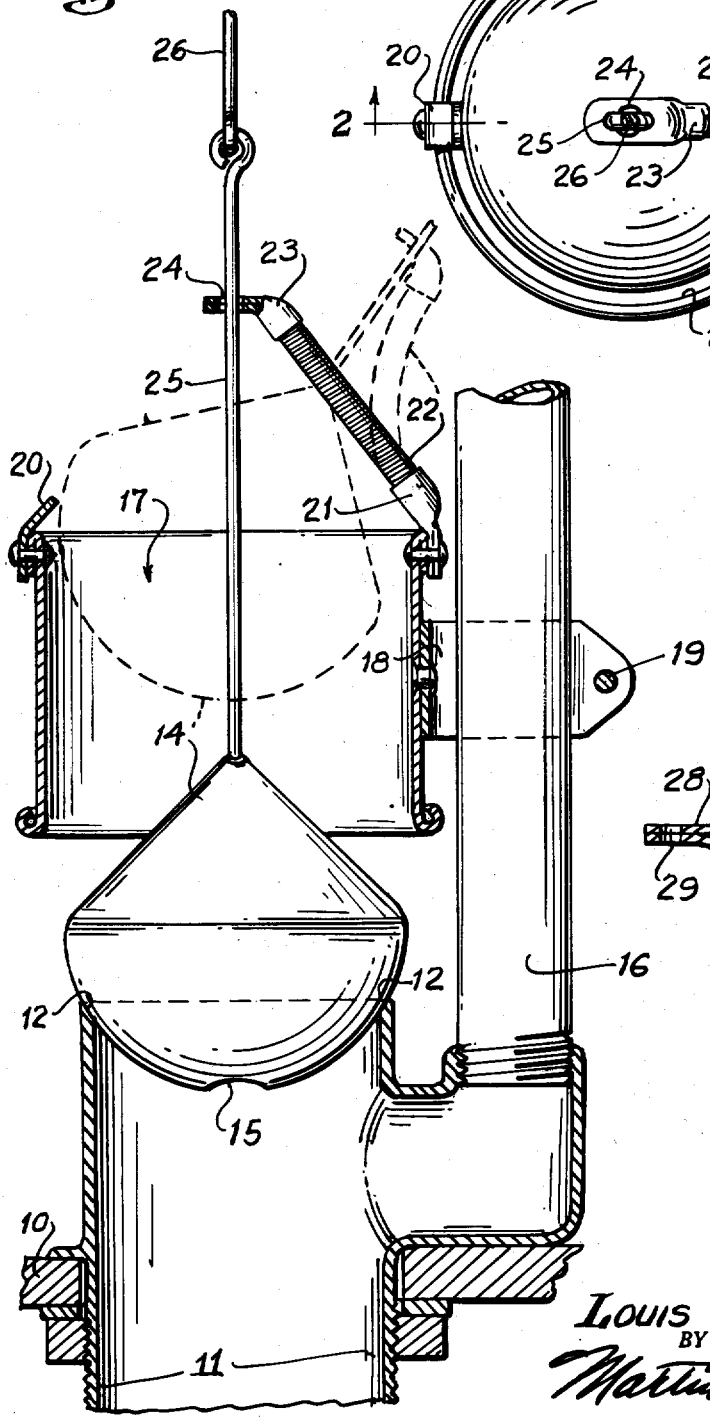
Fig. 2 is a vertical section taken on the line 2—2 of Fig. 1.

Referring by numerals to the accompanying drawing which illustrates a preferred embodiment of my invention, 10 designates the tank, 11 the outlet therefrom, said outlet being provided at its upper end with a seat 12 for the ball valve 14 of conventional shape, and provided at its lower end with the usual opening 15. This ball valve normally rests on seat 12 to close outlet 11.

Mounted for vertical adjustment on the overflow pipe 16 and arranged directly above outlet 11 and the ball valve 14, is a cylinder 17 open at both ends and slightly larger than said ball valve.

Secured to the wall of this cylinder is a horizontally disposed clip 18, which is clamped upon the overflow pipe 16, and secured in such position by means of a clamping screw 19.

Thus, cylinder 17 is to be adjustably secured on the overflow pipe. Suitably secured to the upper edge of cylinder 17, on the side opposite from overflow pipe 16, is a short upwardly and inwardly projecting finger 20 which serves in part, to limit the upward movement of the ball valve 14 in the cylinder 17.

Secured to the upper edge of cylinder 17, opposite finger, is the lower end of a clip 21 in the upper end of which is secured the lower end of a coil spring 22 of fairly small wire, which projects upwardly and inwardly toward a line drawn through the center of ball valve 14 and the cylinder 17.

Secured to the upper end of this wire coil is a clip 23, having a horizontal upper end in which is formed an aperture 24, and the pull rod 25 of the ball valve passes, with a fairly loose fit, through this aperture. Connected to the upper end of said rod is the lower end of a rod 26, or chain, which is actuated by the trip lever of the tank assembly with which the device is associated.

In operation, ball valve 14 rests on its seat 12 thereby closing the outlet 11 and when rod 25 is lifted by the trip lever, the ball valve 14 will be lifted from its seat to permit discharge of water from the tank into outlet 11.

During this elevating movement of the ball valve, same is protected against turbulence of the out-going water and the coil 22 will give readily, to any lateral pressures which may be developed by said ball valve. Ball valve rests on the water until the level thereof reaches a point slightly below cylinder 17 and slightly above seat 12, whereupon the suction of the water acts upon the ball to quickly draw or snap same onto its seat, thereby cutting off further flow of water from the tank.

By adjustment of the cylinder 17 on the overflow pipe 16, the quick closing action of the ball valve may be very accurately regulated.

Figure 3:
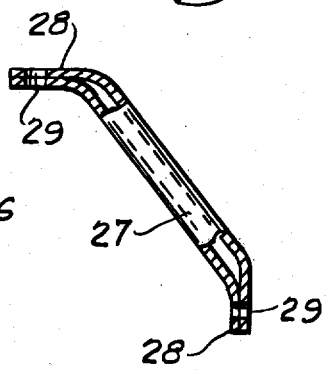
Fig. 3 is an elevational view, partly in section, of a modified form of the resilient member which forms a guide for the pull rod of the flush valve.

The modified form of the support for the pull rod seen in Fig. 3 comprises a tube 27 of resilient plastic or other rubber like substance, the ends of which are pressed together and perforated as designated by 29 to receive an attaching screw and to serve as a bearing for pull rod 25.

Figure 1:
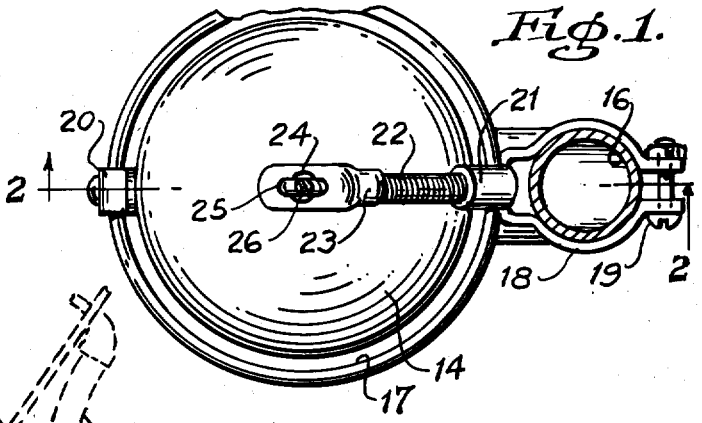
Fig. 1 is a top plan view of my improved flush valve guide.

Due to the flexibility of the member 22 or 27, same may be flexed outward as shown by dotted lines, Fig. 1, so as to permit the ball valve to be removed from cylinder 17.

Thus, it will be seen that I have provided a flush valve ball guide which is simple in structure, inexpensive of manufacture and very effective in performing the functions for which it is intended.

Minor changes in the size, form and construction of my improved flush valve guide may be made and substituted for those herein shown and described without departing from the spirit of my invention, the scope of which is set forth in the appended claim.

I claim as my invention:

*1.* The combination with a flush tank, its outlet pipe, its overflow pipe, a ball valve which closes said outlet pipe and a pull rod attached to the upper end of said ball, of an open ended cylinder mounted for vertical adjustment on said overflow pipe above said outlet pipe and said ball valve, a flexible guide mounted on the upper portion of said cylinder and extending upwardly and inwardly from the wall of said cylinder and a bearing on the upper end of said flexible guide for said pull rod.

*2. A flush valve for use in a tank provided with an opening, comprising: an outlet conduit adapted to discharge through said opening; a ball seat in said conduit; a ball for seating on said ball seat for closing said conduit; a rod attached to the ball and projecting from the upper portion thereof for lifting the ball from the seat so as to open the conduit; an overflow pipe rising to a level above said ball seat and discharging into the outlet beneath the valve seat so as to by-pass said seat; and a guide means for guiding the rise and fall of the ball comprising a flexible tube having an end which is pressed together and perforated to form an aperture for accommodating said rod, said guide means being mounted to said overflow pipe so that said aperture receives the rod above the ball.*

*3. A flush valve for use in a tank provided with an opening, comprising: an outlet conduit adapted to discharge through said opening; a ball seat in said conduit; a ball for seating on said ball seat for closing said conduit; a rod attached to the ball and projecting from the upper portion thereof for lifting the ball from the seat so as to open the conduit; an overflow pipe rising to a level above said ball seat and discharging into the outlet beneath the valve seat so as to by-pass said seat; and a guide*

*means for guiding the rise and fall of the ball comprising a bearing in which said rod is slidable, and a flexible member attached to and supporting said bearing, said guide means being mounted to said overflow pipe so that said bearing receives the rod above the ball.*

*4. Apparatus according to claim 3 in which said flexible member is a spring.*

*5. Apparatus according to claim 3 in which said flexible member is a coil spring.*

References Cited in the file of this patent or the original patent

UNITED STATES PATENTS

| | | |
|---|---|---|
| 1,272,091 | Quinn | July 9, 1918 |
| 2,130,719 | Heath | Sept. 20, 1938 |
| 2,175,973 | Reed | Oct. 10, 1939 |
| 2,328,701 | Woodrum | Sept. 7, 1943 |
| 2,440,389 | Anderson | Apr. 27, 1948 |
| 2,450,609 | Phelps | Oct. 5, 1948 |